United States Patent [19]

Avery

[11] 4,392,785

[45] Jul. 12, 1983

[54] PUMP CONTROL SYSTEM FOR WINDMILLS

[76] Inventor: Don E. Avery, 45-437 Akimala St., Honolulu, Hi. 96744

[21] Appl. No.: 209,897

[22] Filed: Nov. 24, 1980

[51] Int. Cl.³ .............................................. F04B 49/00
[52] U.S. Cl. ..................................... 417/218; 417/334; 417/336
[58] Field of Search ...................... 417/212, 218–222, 417/334, 336, 15, 35; 60/398

[56] References Cited

U.S. PATENT DOCUMENTS

| | | | |
|---|---|---|---|
| 617,877 | 1/1899 | Harris | 417/218 |
| 1,813,078 | 7/1931 | Nyrop | 417/218 |
| 2,688,285 | 9/1954 | Stockett et al. | 417/218 |

Primary Examiner—Edward K. Look
Attorney, Agent, or Firm—Schapp and Hatch

[57] ABSTRACT

A windmill control system having lever means, for varying length of stroke of the pump piston, and a control means, responsive to the velocity of the wind to operate the lever means to vary the length of stroke and hence the effective displacement of the pump in accordance with available wind energy, with the control means having a sensing member separate from the windmill disposed in the wind and displaceable thereby in accordance with wind velocity.

21 Claims, 4 Drawing Figures

PUMP CONTROL SYSTEM FOR WINDMILLS

BACKGROUND OF THE INVENTION

1. Field of the Invention

The present invention relates to windmills or wind turbines having a wind-driven, reciprocating element used to power a reciprocating piston pump, and more particularly to control systems for varying the effective displacement of the pump in accordance with the velocity of available wind.

2. Description of the Prior Art

It has previously been known to vary the effective length of stroke of a windmill driven pump, and thus vary the effective displacement per time unit of the pump, in accordance with wind velocity. This makes it possible to utilize the increasing energy of the wind as wind velocity increases, this energy varying as the cube of the wind velocity. By increasing the length of stroke of the pump as wind velocity increases, more work can be accomplished. In the case of piston pumps, the increased length of stroke provides an increased effective displacement per unit time.

Various proposals have been made for regulating the length of stroke of the pump in proportion to wind velocity. Typical of these proposals is U.S. Pat. No. 1,675,159 to Frederick R. Burch, which utilizes a "regulator setting system" having a fluid power transmitting agent and a speed governor operated by the windmill for regulating the action of the fluid agent in the apparatus in a manner to cause the windmill to operate at a substantially uniform speed under varying velocities of the wind. This sytem is relatively cumbersome, expensive and is not quickly responsive to variations to wind velocity.

Another typical control system is illustrated in U.S. Pat. No. 617,877 to Elmo G. Harris, which also includes a governor system actuated by the rotation of the windmill and utilizing a pressurized fluid valving system to accomplish changes in the length of stroke of the pump.

Another approach to changing the length of stroke of the pump is shown in U.S. Pat. No. 733,799 to Edmond H. Benedict, regulation of the length of stroke of the pump being accomplished by measuring the rate of pump output.

None of the previously known devices control the length of pump stroke in accordance with wind velocity by sensing the velocity of the wind directly, and the Harris and Burch devices require pressurized fluid control systems utilizing a balancing of fluid pressures in the system.

SUMMARY OF THE INVENTION

The windmill pump control system of the present invention effectively varies the length of stroke of the pump in proportion to the velocity of the wind driving the wind mill. The system operates on a substantially constant power coefficient so the output increases as the cube of the wind velocity. No circulation of pressurized fluid, no balancing of fluid pressures, is required.

The present control system utilizes the type of lever mechanism in which the windmill's reciprocating wind-driven element is connected to and swings a pivoted arm back and forth. A connecting rod leading to the piston rod for the pump is slideably connected to the pivoted arm so that, as the connection is moved toward the distal end of the arm, the length of stroke of the pump is increased and, as the connection is moved along the arm toward the pivot point, the length of stroke of the pump is decreased.

In the present control system, the position of the connecting rod along the swingable arm is determined by a hydraulic cylinder pivoted on the windmill tower and having a piston rod attached to the connecting rod. Flow of hydraulic fluid between the opposite ends of the hydraulic cylinder is restricted by normally closed valves and no pump means is required for pressurizing the hydraulic fluid, the closure of the valves serving to "locked up" the piston in the hydraulic cylinder to keep the connecting rod at the desired location, along the swinging arm.

In accordance with the present invention, wind velocity is sensed directly in order to achieve quicker and more precise response. A sensing member having a substantially flat surface is disposed in the wind, with the direction of the wind perpendicular to the surface so that the wind will inflict deflection forces on the sensing member proportionate to wind velocity. This deflection is utilized to control the valves which permit or prevent fluid from one end of the hydraulic cylinder to the other.

It is therefore a principle object of the present invention to provide a pump control system for windmills having a wind-driven reciprocating element operating a piston pump which quickly and precisely increases or decreases the length of pump stroke in accordance with the velocity of the wind so as to utilize the maximum energy-gathering characteristics of the windmill.

Another object of the present invention is to provide a pump control system of the character described in which separate, pressurized fluid systems are eliminated and in which the operating system is passive, except during changes in the wind velocity.

A further object of the present invention is to provide a pump control system of the character set forth in which wind velocity is sensed directly by a member disposed in the wind.

A still further object of the present invention is to provide a pump control system of the character described which is capable of varying the pump displacement as the square of the wind velocity, and varying the pump speed directly as the wind speed, so that the output will vary as the wind speed cubed.

Yet another object of the invention is to obtain the maximum output from a wind-powered pump at different wind velocities by varying the stroke length of a piston pump in a manner causing the output of the pump to increase in proportion to the wind speed cubed.

Another object of the present invention is to provide a windmill pumping system wherein the minimum pump displacement can be made smaller than normal so that pumping can begin in a lighter wind.

A further object of the present invention is to provide a pump control system of the character set forth which is adaptable for use on the windmills having very little starting torque, the system being capable of adjusting the pump stroke to zero when there is no wind.

Yet another object of the present invention is to provide a pump control system of the character described which is readily adaptable for use with windmills of varying sizes and with either vertical or horizontal axis of rotation.

For a fuller understanding of the nature and further objects and features of advantage of the present invention, reference should be had to the following detailed description, taken in connection with the accompanying drawings and the appended claims.

Figure 1:
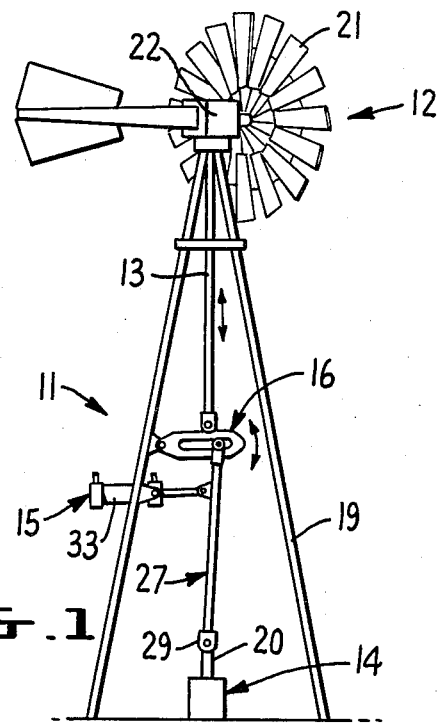
FIG. 1 is a schematic side elevational view of the windmill and the length of pump stroke controlling means of the present invention operatively mounted thereon.

While only the preferred embodiments of the invention have been illustrated in the drawings, it will be apparent as the specifications progresses that modifications could be made to the illustrated structure within the ambit of the claims.

DESCRIPTION OF THE PREFERRED EMBODIMENTS

Referring now to the drawings in detail, it will be seen that the pump control system 11 of the present invention is particularly adapted for use with windmills 12 having a wind-driven reciprocating element 13 operating a piston pump 14, the control system 11 having lever means 16 interposed between the reciprocating element 13 and the pump 14 for varying the length of stroke of the piston (not shown) in the pump, and control means 17 responsive to the velocity of the wind to operate the lever means 16 to vary the length of stroke and hence the effective displacement of the pump 14 in accordance with available wind energy, the control means 17 having a sensing member 18 formed to be disposed in the wind and displaceable thereby in accordance with wind velocity.

Figure 2:
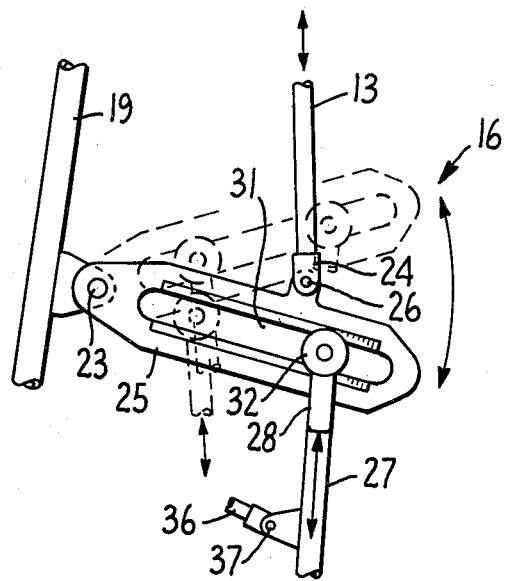
FIG. 2 is an enlarged view of a portion of a mechanism of FIG. 1 showing a swingable arm and connections thereto in two positions.
Figure 3:
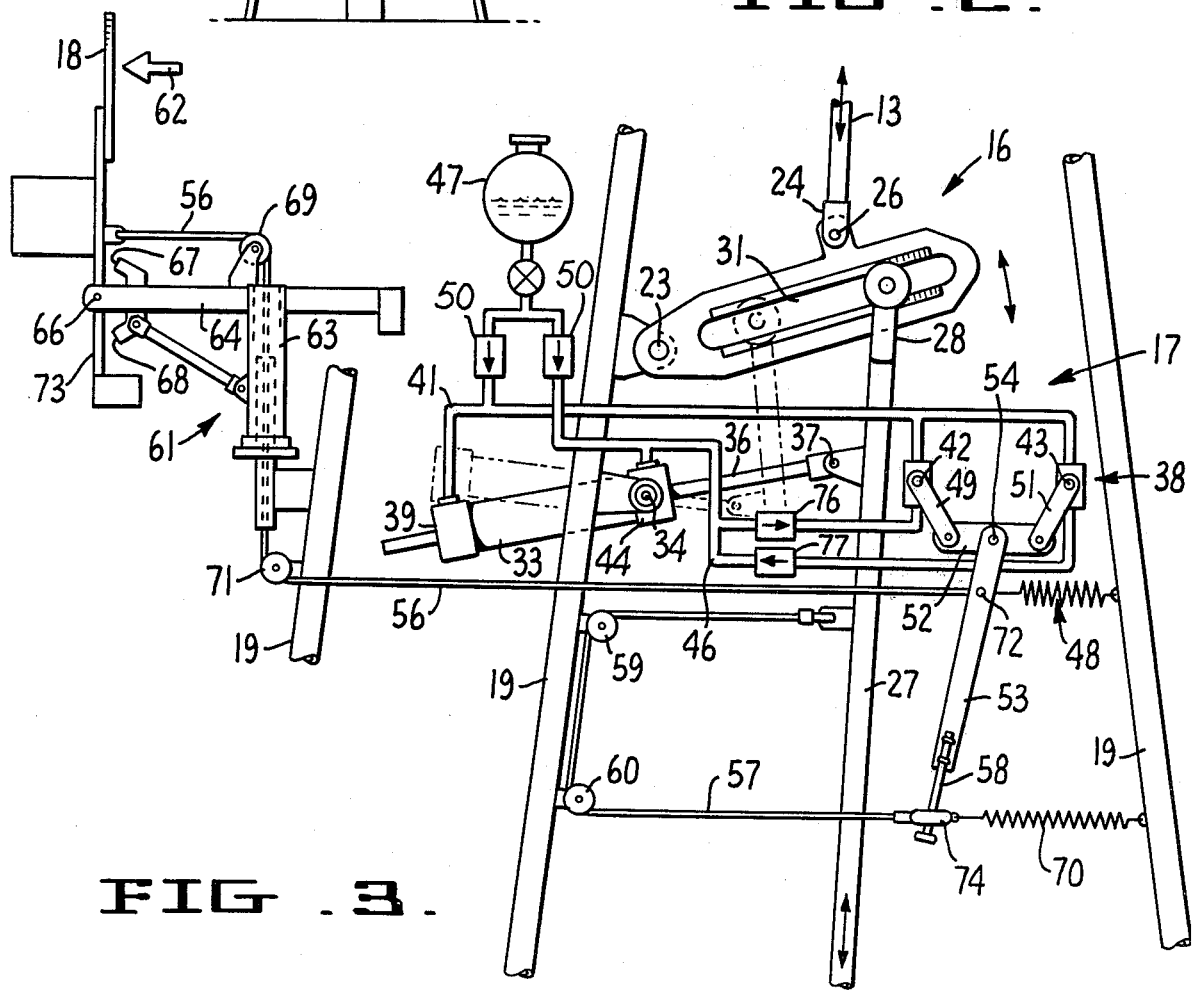
FIG. 3 is a view similar to that of FIG. 2, but also schematically illustrating associated control system components.

In the form of the invention illustrated in FIGS. 1 through 3 of the drawing, the pump control system 11 is incorporated into a conventional "farm" type commercial windmill having an upwardly tapering tower 19 surmounted by a multi-vane, wind-driven wheel 21 operating through a conventional crank mechanism 22 to effect vertical reciprocation of the element 13 in accordance with rotary movement of the wind wheel 21. In accordance with the invention, the control means 17 is formed for operating the lever means 16 to increase the length of stroke of the pump proportionately to the displacement of the sensing member 18 by the wind. It should be understood that the lever means 16 and control means 17 can also function with a rotating type governor driven either by the rotation of the wind wheel 21 (which would not provide as rapid or as accurate response), or by an anemometer driven directly by the wind.

The lever means 16 is interposed between the reciprocating member 13 and the piston rod 20 of pump 14. As may best be seen in FIG. 2 and 3 of the drawings, the lever means 16 has an elongated lever arm 25 pivotally mounted at one end 23 to a fixed structure such as the windmill tower 19 and connected medially of its length, as by clevis 24 and pin 26, to the cut off lower end of the reciprocating element 13. Connecting rod means 27 is here provided and has an end 28 movable along arm 25, and an opposite end 29 operatively attached to the piston rod 20 of pump 14.

Adjusting means 15, operable by the control means 17 and engaging the connecting rod means 27, is formed for adjustably positioning the end 28 of the connecting rod 27 along the arm 25 so as to vary the length of stroke of the piston pump proportionately to the length of stroke of the reciprocating element 13 in response to operation by the control means 17.

As here shown, arm 25 is formed with a slot 31 extending lengthwise along the arm, and a roller 32 carried for rolling movement along the slot 31 is journaled on connecting rod end 28. The distance of stroke of reciprocating element 13 is predetermined by the crank element 22. As roller 32 moves outwardly from pivot 23 along arm 25, the distance of each stroke of connecting rod 27, and hence of the piston and pump 14, increases. Likewise, as roller 32 is moved inwardly toward pivot 23, the distance of the stroke of the pump decreases.

The adjusting means 15 here provides a two-way hydraulic cylinder 33 pivotally supported at 34 on a stationary structure, such as tower 19. A piston rod 36 extends from the hydraulic cylinder 33 and has its outer end pivotally attached at 37 to the connecting rod 27.

The control means 17 has a valve means 38 formed for allowing hydraulic fluid to be forced from one end of the hydraulic cylinder 33 to the other end in accordance with the position of the sensing member 18. The control means 17 is responsive to the position of the roller 32 along arm 25 and the position of the sensing member 18 whereby a constant displacement of the sensing member by a steady wind will cause the hydraulic cylinder 33 to permit the connecting rod 27 to move to a position in which the valve means is closed and will not allow fluid to flow from one end to the other of cylinder 33.

The rear end 39 of hydraulic cylinder 33 is connected to a conduit 41 which communicates with valves 42 and 43. Hydraulic cylinder end 44 is connected a conduit 46 which is connected to the other end of the valves 42 and 43. Conduits 41 and 46 are connected to a fluid reservoir 47 through checkvalves 50 which permit replenishment of any fluid lost from the system. With valves 42 and 43 closed, the system is "locked up", that is, the piston cannot move in hydraulic cylinder 33 and the distance between pivots 34 and 37 remains constant.

In accordance with the present invention, biasing means 48 here in the form of a tension spring, opposes displacement of the sensing member 18 by the wind whereby variations in such displacement caused by variations in wind velocity will cause opening of one or the other of the valves 42 or 43, permitting movement of the piston in hydraulic cylinder 33 to allow movement of the roller 32 along the slot 31 until the valves 42 and 43 are again both shut.

Valves 42 and 43 are preferably provided in the form of easily rotatable plug valves having swingable handles 49 and 51 respectively. A link 52 is pivotally connected to and joins the distal ends of the handles 49 and 51 so that the valves 42 and 43 operate in unison.

Selective opening and closing of valves 42 and 43 is accomplished by a control arm 53 having an end pivoted at 54 on the medial portion of link 52. A cable 56 connects sensing member 18 to the control arm 53 a spaced distance from pivot 54 so as to provide a moveable fulcrum for the control arm. Preferably, and as here shown, cable 56 connects to arm 53 at the same point as spring 48, the spring 48 tending to resist pulling of the cable by the sensing member under the influence of higher wind velocity. A second cable 57 connects the distal end 58 of the control arm 53 to the connecting rod 27 in the manner illustrated in FIG. 3 of the drawings, that is, cable 57 passes over pulleys 59 and 60 supported on the tower 19 in such manner that outward movement of roller 32 along slot 31 pulls the end 58 of arm 53 to the left as viewed in FIG. 3. Movement of roller 32 inwardly toward pivot 23 slackens cable 57, allowing spring 70 to pull arm 53 to the right as viewed in FIG. 3.

Sensing member 18 is mounted on a supporting structure 61, carried on tower 19 at any suitable location, structure 61 being designed to have a weathervane effect so as to keep the flat surface of sensing member 18 perpendicular to the direction of the wind, as symbolized by arrow 62. As here shown, structure 61 provides a hollow, vertical axis swivel 63 having a laterally extending arm 64 pivotally supporting at 66 a somewhat paddle shaped sensing member 18. Stops 67 and 68 limit the possible amount of deflection of sensing member 18 by either the wind or the action of spring means 48. Cable 56 passes over a pulley 69 and thence outwardly through the hollow center of swivel 63 and over a second pulley 71 then horizontally to its connection 72 with arm 53.

The tension spring 70 is mounted between the end of cable 57 contacting control arm end 58 and the tower 19. Spring 70 is not critical but should be strong enough to help equalize inertia forces at the beginning of the stroke and it may be in any size that will keep cable 57 taut. The tension in the spring means 48 must be just enough for arm 73 supporting sensing member 18 to touch stop 68 at the lowest wind speed appropriate for the longest pump stroke.

Control arm 53 and the linkage connecting it to valves 42 and 43 may be made of any suitable, lightweight material. The forces acting on these parts are very small. As here shown, the end 58 of control arm 53 is in the form of a slender rod slideably engaged through a small ring 74 to which both spring 70 and cable 57 are attached.

Valves 42 and 43 are simple shutoff valves, preferably of a type that has very little friction. The linkage controlling these valves is arranged so that, when in the center position illustrated in FIG. 3 of the drawings, both valves are closed, but just barely. Movement of link 52 to the right as viewed in FIG. 3 opens valve 43, while leaving valve 42 closed. Conversely, movement of link 52 to the left opens valve 42 while leaving valve 43 closed.

FIG. 2 illustrates the action of the lever means 16 and depicts the lever arm 25 just as it begins to move upwardly and lift connecting rod 27 and the pumping load below. If it were not restrained by hydraulic cylinder piston rod 36, the roller 32 would be caused by the load to roll down to the distal end of slot 31, taking the attached upper end of connecting rod 27 with it. During the upper half of the rising motion of arm 25, when slot 31 and connecting rod 27 have passed the point where they are perpendicular to each other, roller 32 tries to roll down the incline toward pivot point 23. During the downstroke, there are two more similar reversals.

If valves 42 and 43 are both closed so that no hydraulic fluid can flow in or out of hydraulic cylinder 33, the piston and its rod 36 are locked so the piston rod cannot move in or out of the cylinder. In this situation, the roller 32 remains at a substantially fixed location along slot 31, and the stroke of the pump 14 and its effective displacement also remain fixed.

Operation of the System

Assuming the system is operating as illustrated in FIG. 3 at nearly the maximum wind speed for which the installation is designed, should the wind speed increase the force exerted thereby on flat sensing member 18 increases as the square of the increase in wind velocity. This causes cable 56 to pull fulcrum 72 to the left by a distance also proportional to the square of such increase.

Control arm 53 pivots around its lower end 58 at ring 74, moving link 52 to the left, opening valve 42 while valve 43 remains closed. Hydraulic fluid is then free to flow out of end 44 of hydraulic cylinder 33, through check-valve 76, valve 42, and back through conduit 41 to the rear end 39 of hydraulic cylinder 33. The roller 32 and the upper end of connecting rod 27 is now free to move to the right during the lower half of the movement of lever arm 25, but cannot move to the left, thereby increasing the stroke length and effective displacement of the pump.

When connecting rod 27 moves to the right, control cable 57 stretches spring 70, pivoting the control arm 53 about point 72, thus moving link 52 to close valve 42. The parts move to a position of equilibrium with respect to wind speed and will remain in this position unless the wind speed changes.

If the wind speed drops, the reduced pull on cable 56 allows spring 48 to pivot control arm 53 about its lower end 58 moving link 52 to the right to open valve 43. In this condition, fluid is free to flow out of the rear end 39 of hydraulic cylinder 33, through valve 43, check valve 77 and back through conduit 46 to the front end 44 of cylinder 33, thereby allowing the roller 32 to move to the left along slot 31, thus shortening the stroke length of the pump and reducing the effective displacement per time unit.

The system is self-correcting. If for any reason the roller 32 moves along slot 31, say to the right, cable 57 will pull the lower end 58 of control arm 53 to the left, as viewed in FIG. 3, causing control arm 53 to pivot about point 72 and open valve 43. Fluid is then free to flow through check valve 77, allowing piston rod 36 to move to the left until valve 42 is closed. Thus, the position of fulcrum point 72, in effect, determines the displacement of the pump.

The pump control system of the present invention is adaptable for use with windmills other than the "farm" type windmill illustrated in FIGS. 1 through 3 of the drawings. An example of a different type of windmill utilizing the present pump control system is shown in FIG. 4 of the drawings in which a vertical axis wind turbine 81 is shown.

Figure 4:
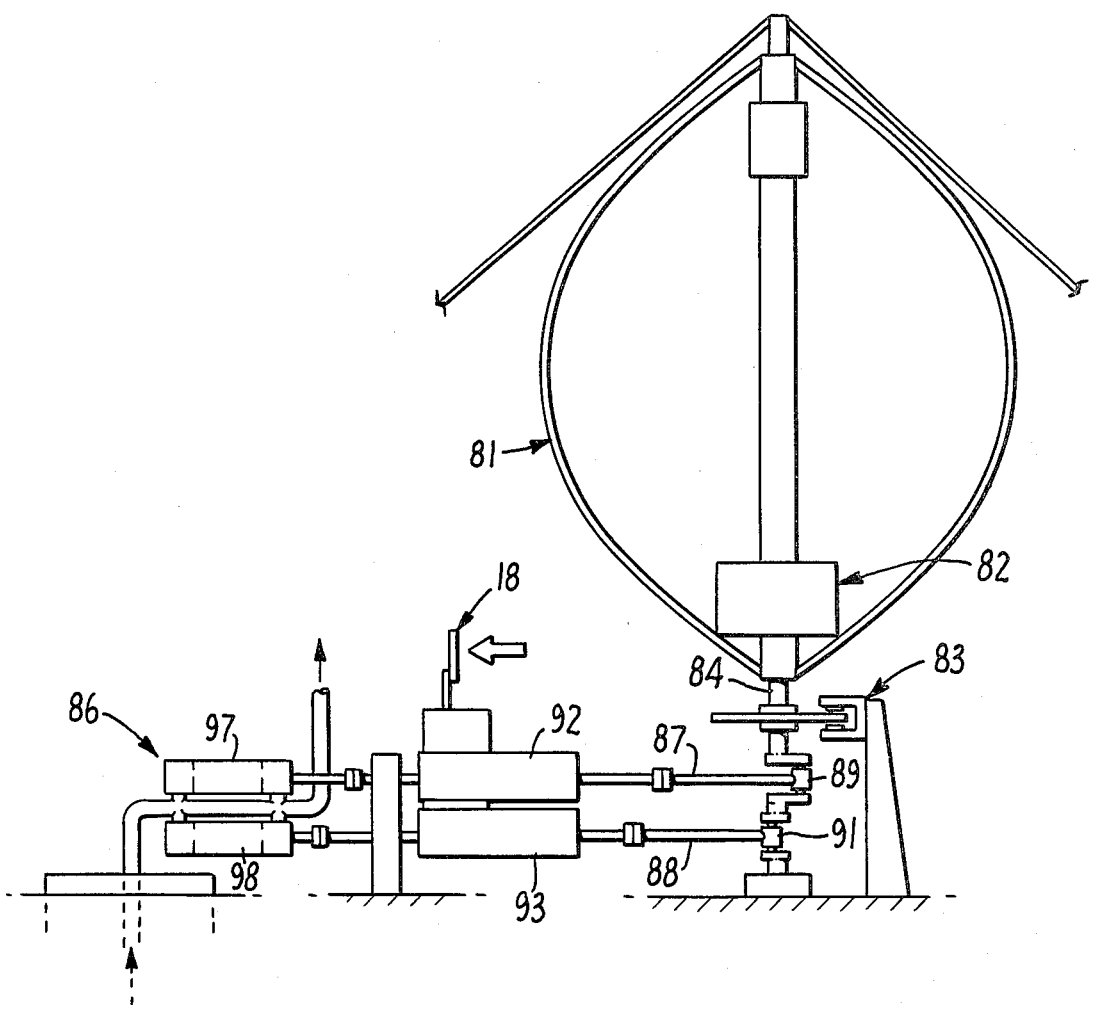
FIG. 4 is a schematic side elevational view of a vertical axis wind turbine driving dual pumps and having a pump control system in accordance with the present invention operatively associated therewith.

It should be appreciated that the pump control system of the present invention is also adapted for use with dual pumping units, and a dual pump arrangement 86 is illustrated in FIG. 4 of the drawings. As there shown, reciprocating elements 87 and 88 are driven by 90° offset cranks 89 and 91 connected to output shaft 84.

A pair of pump control units 92 and 93 are connected to and driven by reciprocating members 87 and 88, respectively, control units 92 and 93 having connecting rods 94 and 96 to the dual pump unit 86. The control units 92 and 93 are similar to the control system shown in FIG. 3 of the drawings, except they are rotated 90° to lie flat. Of course, a single pump control unit could be arranged to handle both pumps.

The operation of the control units 92 and 93 is essentially similar to the description given of the operation of the control system illustrated in FIG. 3 of the drawings, the length of stroke of the pump pistons 99 and 101 being controlled in accordance with wind velocity.

From the foregoing, it will be apparent that the windmill pump control system of the present invention provides rapid and accurate, self-regulating response to changes in wind velocity to increase or decrease the effect displacement of the pumps in proportion to wind velocity so as to accomplish efficient use of available wind energy.

What is claimed is:

1. In a windmill having a wind driven reciprocating element operating a piston pump, a control system comprising
    lever means interposed between said reciprocating element and said pump for varying the length of stroke of the piston in said pump,
    and control means responsive to the velocity of the wind to operate said lever means to vary the length of stroke and hence the effective displacement of said pump in accordance with available wind energy,
    said control means having a sensing member separate from the windmill formed to be disposed in the wind and displaceable thereby in accordance with wind velocity.

2. A control system as defined in claim 1, and wherein said control means is formed for operating said lever means to increase the length of stroke of said pump proportionately to the displacement of said sensing member by the wind.

3. A control system as defined in claim 2, and wherein said lever means and said control means are formed so that the stroke length and consequent displacement of said pump varies as the square of the wind velocity.

4. A control system as defined in claim 3, and wherein said lever means comprises
    an elongated lever arm pivotally mounted at one end and connected medially of its length to said wind driven reciprocating element,
    connecting rod means having an end movable along said arm and an opposite end operatively attachable to said pump,
    and adjusting means operable by said control means and engaging said connecting rod means, said adjusting means being formed for adjustably positioning said first named end of said connecting rod means along said arm so as to vary the stroke of said piston pump proportionately to the stroke of said reciprocating element in response to operation by said control means.

5. A control system as defined in claim 4, and wherein said elongated lever arm is formed with a slot extending lengthwise therealong, and a roller carried for rolling movement along said slot is journalled on said first named end of said connecting rod means.

6. A control system as defined in claim 4, and wherein said adjusting means comprises
    a two way hydraulic cylinder pivotally supported on a stationary structure,
    and a piston rod extending from said hydraulic cylinder and having its outer end pivotally attached to said connecting rod means,
    said control means having a valve means formed for allowing hydraulic fluid to be forced from one end of said hydraulic cylinder to the other end in accordance with the position of said sensing means.

7. A control system as defined in claim 6, and wherein said control means is responsive both to the position of said first named connecting rod means along said arm and the position of said sensing member whereby a constant displacement of said sensing member by a steady wind will cause said hydraulic cylinder to permit said connecting rod means to move to a position in which said valve means is closed.

8. A control system as defined in claim 7, and wherein said valve means comprises
    a first valve formed when open for permitting flow of hydraulic fluid from a first end of said hydraulic cylinder to a second end,
    a second valve formed when open for permitting flow of hydraulic fluid from said second end of said hydraulic cylinder to said first end,
    and biasing means opposing displacement of said sensing member by the wind whereby variations in such displacement caused by variations in wind velocity will cause opening of one of said valves permitting said hydraulic cylinder to allow movement of said roller along said slot until said valves are again both shut.

9. A control system as defined in claim 8, and wherein said valves have swingable handles, a link joins the distal ends of said handles, a control arm is pivoted on the medial portion of said link, a cable connects said sensing member to said control arm, spring means resists movement of said control arm in response to higher wind velocity, and a second cable connects the distal end of said control arm to said connecting rod means.

10. A control system as defined in claim 1, and wherein said sensing member provides a paddle portion having a flat surface disposed substantially perpendicular to the direction of the wind whereby the wind tends to deflect said paddle portion in accordance with the force of the wind impinging thereon.

11. A control system as defined in claim 10, and wherein a cable connects said sensing member to a portion of said control means for tending to displace same in accordance with the force of the wind impinging said paddle portion.

12. A control system as defined in claim 11, and wherein said sensing member is mounted on a weathervane means whereby changes in the direction of the wind cause said paddle portion to change position and remain perpendicular to the direction of the wind.

13. A control system as defined in claim 12, and wherein spring means is connected to the end of said cable remote from said sensing member for biasing said cable to resist said displacement of said sensing member by the wind.

14. A control system is defined in claim 1, and wherein said control system is mounted on a horizontal axis windmill carried on a vertical tower, and said reciprocating element moves substantially vertically.

15. A control system as defined in claim 1, and wherein said control system is operatively connected to a vertical axis wind turbine, and said reciprocating element moves substantially horizontally.

16. A pump control system for windmills having a wind driven reciprocating element operating a piston pump, comprising
    a swingable arm pivotally connected to said reciprocating element and having an end adapted for pivotal attachment to a fixed supporting structure, said arm being formed with an elongated slot extending lengthwise thereof, a roller formed for rolling movement along said slot, a connecting rod having an end journalling said roller and an opposite end adapted for connection to said pump, a hydraulic cylinder adapted for pivotal attachment to a fixed supporting structure and having an extendable piston rod, a pivotal connection of the distal end of said piston rod to said connecting rod, said hydraulic cylinder and said piston rod lying in a plane parallel to the plane of movement of said arm wherby the distance of extention of said piston rod determines the position of said roller along said arm and hence the ratio of distance of movement of said connecting rod with respect to distance of movement of said reciprocating element, and control means for said hydraulic cylinder responsive to wind velocity for establishing said roller at a desired position along said arm to establish and maintain a desired length of pump stroke with respect to wind velocity.

17. A pump control system as defined in claim 16, and wherein said control means is responsive both to the position of said roller along said arm and to the position of a wind sensing member whereby a constant displacement of said sensing member by a steady wind will cause said hydraulic cylinder to permit said connecting rod to move to a position in which said control means is passive.

18. A pump control system as defined in claim 17, and wherein said control means has a valve means formed for allowing hydraulic fluid to be forced from one end of said hydraulic cylinder to the other end in accordance with the position of said sensing member, said valve means comprising a first valve formed when open for permitting flow of hydraulic fluid from a first end of said hydraulic cylinder to a second end, a second valve formed when open for permitting flow of hydraulic fluid from said second end of said hydraulic cylinder to said first end, and biasing means opposing displacement of said sensing member by the wind whereby variations in such displacement caused by variations in wind velocity will cause opening of one of said valves permitting said hydraulic cylinder to allow movement of said roller along said slot and consequent varying of the force extered by said biasing means until said valves are again both shut.

19. A pump control system as defined in claim 18, and wherein said valve means further comprises swingable handles on said valves for effecting opening and closing of said valves, said valves being mounted in parallel spaced relation, a link pivotally secured at its ends to the distal ends of said handles, an elongated control arm having an end pivotally attached to said link medially of its length, a cable connecting said sensing member to said elongated control arm a spaced distance from its attachment to said link so as to provide a movable fulcrum for said control arm, spring means adapted for connecting said connection of said cable to said control arm to a fixed structure, said spring means tending to resist pulling of said cable by said sensing member under the influence of higher wind velocity, and a second cable connecting the distal end of said control arm to said connecting rod.

20. A pump control system as defined in claim 16, and wherein said control system is mounted on a horizontal axis windmill carried on a vertical tower, and said reciprocating element moves substantially vertically.

21. A pump control system as defined in claim 16, and wherein said control system is operatively connected to a vertical axis wind turbine, and said reciprocating element moves substantially horizontally.

* * * * *